United States Patent [19]

Cardone et al.

[11] 4,090,162
[45] May 16, 1978

[54] MAGNETIC ANCHORING APPARATUS

[76] Inventors: Michele Cardone, Via Boschetto, 19; Angelo Grandini, Via Bemba, 16; Bruno Zaramella, Via Paola Sarpi, 3, all of 20090 Trezzano, S.N. Milan, Italy

[21] Appl. No.: 622,369

[22] Filed: Oct. 14, 1975

[30] Foreign Application Priority Data

Oct. 16, 1974 Italy .......................... 28487 A/74

[51] Int. Cl.² ............................................. H01F 7/20
[52] U.S. Cl. .................................... 335/289; 335/291
[58] Field of Search ............... 335/289, 290, 291, 294, 335/295, 284

[56] References Cited

U.S. PATENT DOCUMENTS

| 3,089,064 | 5/1963 | De Bennetot | 335/289 |
| 3,316,514 | 4/1967 | Radus et al. | 335/291 |
| 3,428,867 | 2/1969 | Becker | 335/284 X |
| 3,978,441 | 8/1976 | Sobottka et al. | 335/289 |

*Primary Examiner*—George Harris
*Attorney, Agent, or Firm*—Watson, Cole, Grindle & Watson

[57] ABSTRACT

Magnetic apparatus for securing ferromagnetic pieces to lifting equipment, conveying devices and machine tools. The apparatus comprises a first nonreversible magnetopermanent core; a second reversible magnetopermanent core coacting with the former on a same magnetic yoke defining part of the work securing surface, and a solenoid wound about said reversible core and supplied with direct current in either direction for a period of time sufficient to cause said reversible core to follow a portion of the hysterisis loop thereof to generate an electromagnetic field for inverting the polarization of said core, thus enabling respective activation or deactivation of the work securing surface.

5 Claims, 7 Drawing Figures

MAGNETIC ANCHORING APPARATUS

Generally, this invention relates to a magnetic clamping or work securing apparatus for holding ferromagnetic pieces to a working plane, the magnetic circuit of which is formed by the addition of two magnetopermanent fields, and the control of which is provided by the inversion (half-hysterisis) of one of the magnetopermanent fields through the action of an electromagnetic field.

SUMMARY OF THE INVENTION

It is the object of the present invention to provide magnetopermanent anchoring apparatus or devices which, when compared with existing magnetic flux control equipments, are characterized by higher mechanical magnetic performances, along with greatly improved reliability.

Recently, the use of magnetic apparatus or devices has solved considerable problems in anchoring ferromagnetic pieces to be mechanically processed, lifted and conveyed. Such uses have found wide application in the field of tool machines (such as grinding machines and surface grinders), where the components are generally previously roughened and require relatively light machine finishing processes. The use of such magnetic apparatus has also partly entered the lifting and conveying field, where it is effectively applied to handling comparatively lightweight loads, or heavy loads, to be transported in unfrequented areas.

In other terms, the use of magnetic flux control apparatus or devices, primarily due to limitations in their developed performances, because of various disadvantages related to the nature of the apparatus or device, could not effectively be incorporated into many other industrial fields, such as that of chip removing machines, for example milling, planing, boring and shaping machines, or that of lifting large mass loads within frequented areas, where the natural advantages of magnetic holding apparatus would result in the highest output performance.

Commercially existing magnetic anchoring apparatus or devices can be divided into two large classes:

(a) Electromagnetic apparatus or devices, which are energized and de-energized by controlling the electric power admitted to solenoids.

These apparatus or devices have magnetic performances directly proportional to the amount of electric power supplied to the solenoids which represents the real limit of such apparatus or devices. Thus, the continuous amperage capable of being handled by solenoids, is normally of a very low rate, thereby resulting in comparatively reduced magnetic performances. These apparatus or devices are also characterized by more secondary drawbacks, such as overheating (still due to continous supply of electric power to the solenoids) which is transmitted to the mechanical components of the apparatus or device and causes serious deformations, as well as some degradation in the magnetic performances. Moreover, in use, such apparatus or devices have poor reliability, since a sudden interruption in electric supply, or a short in the power circuit would cause an immediate demagnetization and release of the secured material. This is responsible for serious risk to the operator's safety, and serious damages to the machine tool on which the apparatus or device is being used.

Because of being susceptible to wear, electromagnetic anchoring apparatus or devices require constant servicing; the continous supply of rectified electric current requires quite complicated or oversized equipment, also requiring constant servicing or maintenance and susceptible to fast wear or frequent failures. Finally, such apparatus or devices involve high consumption of electric power, the latter being a purely economical disadvantage, which becomes important in direct proportion with the extent of use and size of the apparatus or device.

(b) Permanent magnet apparatus or devices, energization and de-energization of these apparatus or devices provided by physically displacing one or more batteries of permanent magnets, a "magnetic package", located within the apparatus or device, such displacement being provided by lever and cam or screw mechanisms. When compared with electromagnetic apparatus or devices, conventional permanent magnet devices or apparatus are always have greater reliability, but are also characterized by reduced magnetic power. This disadvantage is mainly due to poor exploitation of the magnetic material being used and, secondarily because of the requirement of translating the magnetic package.

Additionally, the mechanical structure thereof is of low strength due to the requirement of translating the inner magnetic package, this involving further limits in dimensioning, whereby such permanent magnet apparatus or devices can be effectively made only in relatively small size.

The invention provides a magnetic anchoring apparatus of the type comprising at least one magnetic circuit with yokes or ferromagnetic parts defining a work surface or an anchoring surface for the ferromagnetic pieces. A first permanent magnetic core of non-reversible type (as hereinafter defined), a second reversible (as hereinafter defined) permanent magnetic core acting with the former onto the same magnetic yoke, and a polarization inverting solenoid surrounding the reversible magnetic core are included with the solenoid being supplied with direct current in one direction or in the opposite direction, respectively, to generate opposite electromagnetic fields for inverting the polarization of the second magnetic core to energize or de-energize, respectively, the work surface.

In addition to the high magnetic performances hereinafter disclosed, the described circuit has complete mechanical stability. This is an extremely important factor in all of those cases where in addition to anchoring, the magnetic equipment is intended to act as a striking plane for the workpiece, which is the case in most actual and potential applications of any magnetic equipment.

As previously stated, there are serious disadvantages in this connection with the use of conventional magnetic equipment. Thus, due to the continous feeding of electric power to the solenoids, electromagnetic equipment generate heat causing expansion in mechanical components and accordingly in the work surface. Due to the requirement of translating the inner magnetic package, conventional permanent magnet equipment is always provided with a suitably machined surface plate, acting as a clamping or work surface, which is made fast with the base plate only through a small circumferential band corresponding to the section of the magnetic package-containing frame. In all of the other locations (the sum of which is at least 90% the total surface) a tolerance of a few tens of millimeter is built up between the plate underside and top surface of the magnetic package, which tolerance is essential for moving the magnetic package. This enables the work surface of conventional permanent magnet equipment to flex to a larger or smaller extent, depending on the width of the equipment surface plate.

The magnetopermanent equipment based on the circuit according to the invention is not subjected to overheating (current is admitted to the solenoid for a time interval less than 0.01 sec., thus avoiding the occurrence of any thermal phenomenon), or to flexures or bendings due to empty spaces within the equipment, all of the circuit components being quite static and rigid with one another. The complete lack of moving parts in the circuit avoids any need of servicing or maintenance.

In other terms, a circuit for an apparatus according to the invention is provided with increased stability because of its monolithic construction.

An apparatus according to the invention is further characterized by being quite reliable. Thus, the circuit is completely magnetopermanent and the use of electric power is only for energizing and de-energizing a specified work surface. The operation of the latter completely depends on the polarization directions of the two magnetopermanent circuits and is quite self-governing from external sources. In case of main breakdowns, or failures in the apparatus controlling the electromagnetic circuit, the only shortcomings to be found in an apparatus incorporating a magnetopermanent circuit according to the invention, will be related to the impossibility of energizing or de-energizing the work surface. Because that does not represent any risk to the operator's safety, such shortcomings will have no practical consequences, in case of electric power breakdown, because of being impossible to use the machine tool on which the apparatus is provided.

Finally, under the same magnetic performances developed on a specified work surface, reference is herein made to equipment intended for abrading machine tools, such as grinding machines and surface grinders, where the performances of conventional magnetic equipments are sufficient, the weight of an apparatus according to the invention is less than one half and the height less than one third that of equipment having same surface dimensions.

BRIEF DESCRIPTION OF THE FIGURES

The embodiments of magnetic circuits for anchoring apparatus or devices according to the invention along with a preferred embodiment of the apparatus or device, will now be described with reference to the accompanying drawings, in which:

With reference to FIG. 1, anistropic melted magnets: (alloys of iron-nickel-aluminum-cobalt, exposed to a magnetic field at about (Curie point), are referred to in the following description as "ALNICO V", such a term including any alloy developing a BHmax rate (energy product) of 4.5+5.2 megagaussoersteds (C.G.S. system), such as "Alcomax III" produced by James Neill Ltd., England, "Maxalco" or "Coalnimax" Italy, and "Ticonal" produced by Allevard Ugines, France.

Figure 1:
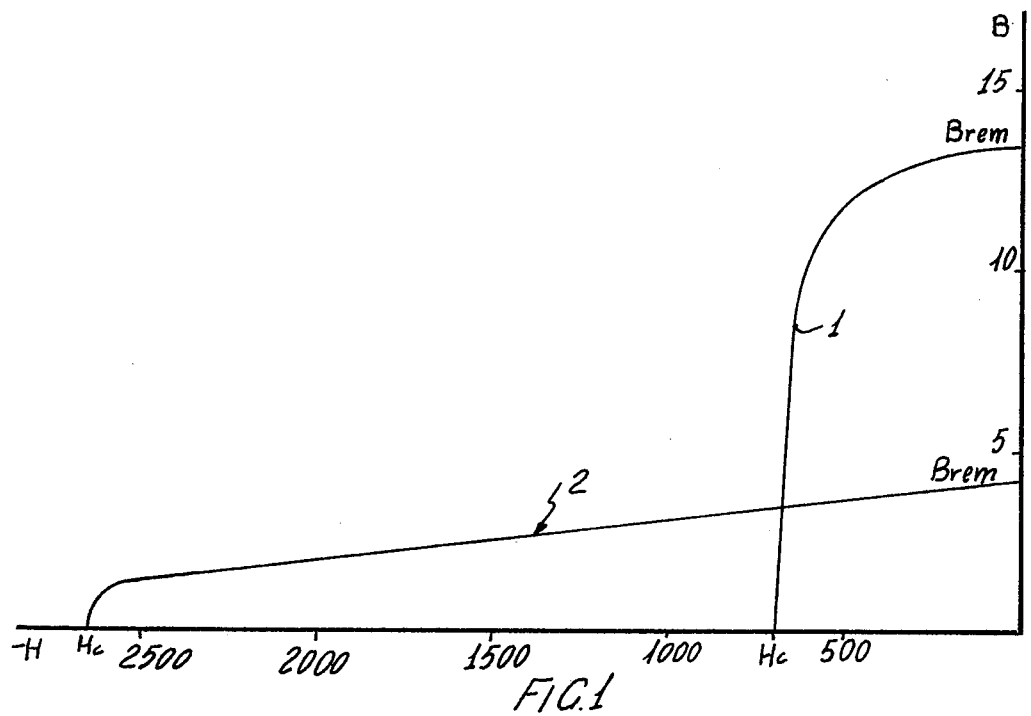
FIG. 1 is a diagram of the left top quadrant of the hysterisis loop showing the features of the permanent magnets used in the circuit of the apparatus according to the invention.

Such magnets are characterized by a very high Brem rate (magnetic residual remanence following saturation), higher than 12 Kgauss, accompanied by a rather limited Hc rate (coercivity), slightly higher than 600 Oersted, as diagrammatically shown in FIG. 1 by curve 1. When saturated in a closed magnetic circuit, Alnico V develops unique permanent magnetic characteristic irreversibily degrading and in geometrically inverse proportion to the width of the work gap (reluctance). Such a gap is essential whenever it is required to generate a magnetic field externally of a circuit, and the "throw" or field depth of any magnetic circuit is always directly proportional to the gap width (spacing between North and South poles). However, a magnetic circuit using "Alnico V" cores, to maintain a proper magnetomotive force to operate such cores, they should be provided with a gap having a width less than one fifth the length of the preferential axis of the core being used, to avoid the penalty of an undue degradation in the Brem rate of the core.

Anisotropic ceramic magnets: (material on the base of ferrites, such as barium oxide finely ground, pressed and baked at suitable temperature, then exposed to a magnetic field at about Curie point), are hereinafter referred to as anisotropic Bariumferrite, such a term including any ceramic magnet developing a BHmax rate of 2.8+3.2 megagausseorsteds (C.G.S. system), such as "Ferroxdure II and III" or "Sinterox II and III" produced by Sampas Spa and Centro Magneti Permanenti Spa, Italy, "Feroba II and III" produced by Allevard Ugines, France, and the like. This material, that has been recently prepared, is not widely used in producing controlled flux, permanent magnet anchoring apparatus or devices. Such a material is characterized by a comparatively low Brem rate (roughly in the order of one fourth that of Alnico V), but having an extremely high Hc rate, three times or more higher than the former, as shown by curve 2 in FIG. 1, with the Brem rate being substantially constant or slightly variable within a wide range of gaps or reluctances.

Permanent magnet anchoring apparatus or devices using anisotropic bariumferrite magnets provide reduced performances because of the low Brem rate of the magnetic material used. The apparatus using Alnico V magnets provide modest performances due to the required compromise between stabilization of magnetic residual remanence and the width of the work gap.

However, the more or less highly operative effectiveness of the magnetic circuit (field depth) and the more or less amount of dispersed flux will depend on the gap width.

In providing a magnetic circuit for an apparatus according to the present invention, the disadvantages inherent in conventional circuits have been duly taken into account. The apparatus based on the circuit according to the invention are characterized by a remarkably higher magnetic power, a complete mechanical stability and full reliability.

Since a material having the same Brem rate as Alnico V, along with a Hc rate similar to that of anisotropic Bariumferrite cannot be made available, a magnetopermanent circuit is used in which, by simultaneously suitably using the aforementioned two materials and avoiding "breakdowns or interruptions" on Alnico V circuit, it is possible to obtain a considerable improvement of the useful performances in the ratios of size-power and size-field depth.

A first embodiment of a magnetic circuit for a magnetic anchoring apparatus or device according to the invention and the operation thereof will now be described with reference to FIGS. 2 and 3 of the accompanying drawings.

Such a circuit substantially comprises a first permanent magnetic core 3 of anisotropic bariumferrite type, which for its magnetic features and for the purposes of the present invention is referred to as "non reversible", thereby meaning that during the use of the apparatus or device its magnetization state or magnetic field is not inverted; a second permanent magnetic core 4 of "Alnico V" type which for its magnetic features and for the purposes of the present invention is referred to as "reversible", thus meaning that during the use of the apparatus or device, unlike the former magnetic core 3, its magnetization state or its magnetic field is inverted, causing it to traverse the top half or the bottom half of the hysterisis loop, respectively, to energize or de-energize the magnetic anchoring apparatus.

Reversible core 4 is surrounded by a solenoid 5 consisting of copper turns or any other good electrical conductor, in which a direct current is circulated in one direction or in the opposite direction for a time interval sufficient to cause core 4 to traverse either of the aforesaid two hysterisis semicycles, respectively.

Figure 2:
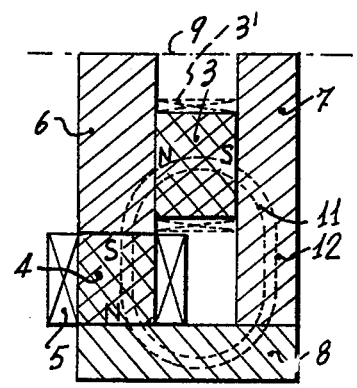
FIG. 2 shows a first embodiment of a magnetic circuit in its de-energized condition in accordance with the invention.

Both magnetic cores 3 and 4 act upon the same magnetic yoke 6, contacting the latter through a respective pole thereof, that is a North pole for non-reversible core 3 and a South pole for reversible core 4, at the demagnetization condition of work surface 9, as shown in FIG. 2. In the example shown in FIG. 2 and FIG. 3, magnetic cores 3 and 4 have polarization directions at 90° with respect to each other, contacting adjoining faces of the parallelepiped block of ferromagnetic material comprising yoke 6. However the component arrangement or magnetic circuit geometry may also be changed, as described in the following, depending on the application requirements and without departing from the principles of the present invention.

Yoke 6 of the magnetic circuit for the anchoring apparatus shown in FIG. 2 extends over reversible core 4, beyond non-reversible core 3 to provide a first direct induction pole-piece, and the magnetic circuit is completed by a second indirect induction pole-piece 7 which, along with reversible core 4, bears on a further ferromagnetic yoke 8 that, in case of parallel connected circuits, forms the connection crown or means for the indirect induction pole-pieces 7, as later described in connection with the example of FIG. 4. Preferably, yoke 8 should be made of high magnetic permeable material, such as unalloyed iron or steel, having the less percentage of carbon as possible, for example less than 0.03%. As a whole, pole pieces 6 and 7 define a work or anchoring surface for a ferromagnetic piece 10, as schematically shown in FIG. 3.

Figure 3:
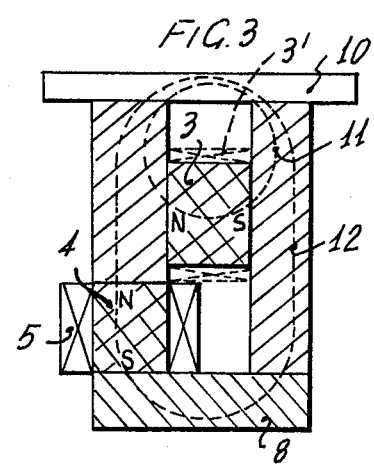
FIG. 3 shows the circuit of FIG. 2 in its energized condition.

As previously stated, FIGS. 2 and 3 differ from each other in that FIG. 3 shows the deactivated condition for work surface 9, the two permanent magnetic cores 3 and 4 being similarly polarized, while FIG. 3 shows the activated condition of work surface 9 for holding the ferromagnetic piece 10, the two cores 3 and 4 being polarized in opposition to each other, so that the fields thereof cooperate in anchoring piece 10.

A more detailed description is hereinafter given still referring to the circuit of FIGS. 2 and 3, since the basic principle and operative steps will be the same as for the designs to be later described.

Having provided the indirect induction pole-piece 7, or a plurality of pole-pieces 7 in case of a combination of simple diagrams of the magnetic circuit of FIG. 2 on yoke 8, reversible core 4 is assembled, by inserting a determined amount of "Alnico V" type of magnets, having predetermined cross-sections and polar lengths, within solenoid 5, which is the same height as the polar lengths of reversible core 4. During assembly, this reversible core is always kept a demagnetized state.

Direct induction pole-piece or common yoke 6 is then assembled, causing it to bear on the upper pole of reversible core 4. Thus a recess if formed between the inner walls of pole-pieces 6 and 7, in which the permanent magnetic core 3 is mounted, the total magnetic residual remanence (total Brem) rate of which correctly corresponds to the rate of the total magnetic remanence (total Brem) of the reversible core. Non reversible core 3 is mounted in its saturation premagnetized state, which is possible due to the high rate of Hc of this material.

Just under this condition, there is in the magnetic circuit a first magnetic field, schematically shown by flux line 11 in FIG. 3, capable of activating work surface 9.

Now, solenoid 5 is used for generating an electro magnetic field of a very short duration, such as for a time interval less than 0.01 sec, acting to saturate reversible core 4 which, as result, will build up a magnetopermanent field of its own. The current direction and the winding direction for the turns of solenoid 5 shall be such as to generate an electromagnetic field 12 (FIG. 3) that polarizes reversible core 4 in a direction, such as that shown in FIG. 3, so that its magnetic field through yokes 6, 7 and 8 adds to the magnetic field generated by non-reversible core 3, substantially contributing to the activation of work surface 9. Thus, during the entire activation period of the work surface, there is no current flowing in solenoid 5 and the actual anchoring apparatus can be effectively considered as a permanent magnet apparatus, since the solenoid is only for controlling or inverting the direction of magnetization of reversible core 4.

Thus, when work surface 9 is deactivated in order to release ferromagnetic piece 10, it is sufficient to supply solenoid 5 with an instantaneous current in a direction opposite to the first direction, generating an electromagnetic field still of a very short duration in the opposite direction and polarity opposite to the former. This electromagnetic field of opposite direction causes reversible core 4 to follow half of the hystersis loop for a similar polar inversion, as schematically shown in FIG. 2. Therefore, reversible core 4 generate a magnetopermanent field on non-reversible code 3 which through common ferromagnetic yoke 6, 7 and 8 provides an attractive force, whereby a mutual shortcircuit, as shown in FIG. 2, and full deactivation of work surface 9 is provided.

A further supply of current to solenoid 5 in a direction opposite to the first direction, will again cause an immediate polar inversion (or half-hysterisis) of reversible core 4, the latter generating again a repulsion magnetopermanent field relative to that of non-reversible core 3, with resulting re-activation of the work surface (FIG. 3).

Figure 4:
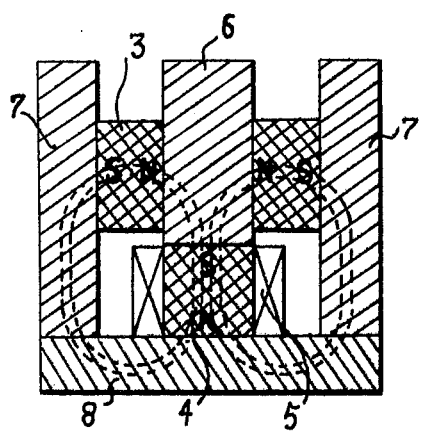
FIG. 4 shows a modification of the magnetic circuit of FIG. 1.

The embodiment of FIG. 4 differs from that of FIG. 2 only in that the magnetic circuit is doubled and the single reversible magnetopermanent core 4 is centrally placed, being in opposition to, or in attraction with, the magnetic fields generated by the two non-reversible magnetopermanent cores 3 arranged on the opposite sides of the common yoke or direct induction pole-piece 6, with the direction of megnetization still perpendicular to the common yoke and to that of the reverisble core 4 axially aligned therewith. In FIG. 4, like numerals designate parts corresponding to those of the preceding figures.

In the case of FIG. 4, which mechanically is the most suitable for providing large magnetic anchoring planes or tables, the two non-reversible cores 3, interposed within the two slots or recesses provided between the central direct induction pole-piece 6 and the side, indirect induction pole-pieces 7, supported by the common yoke 8, have the same rate of magnetic residual remanence (Brem), such that the sum is always equal to the rate of total magnetic residual remanence of reversible common core 4. The operation of the magnetic circuit of FIG. 4 is completely identical to that of the above described FIGS. 2 and 3.

Figure 5:
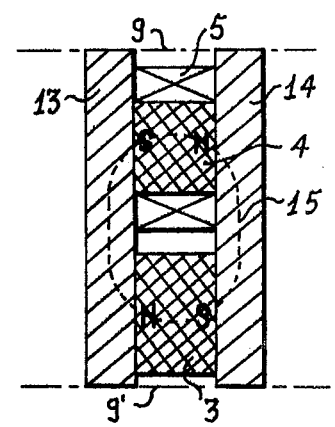
FIG. 5 shows a second modification of the magnetic circuit.

In the embodiment of FIGS. 5 reversible and reversable magnetopermanent cores 3 and 4, respectively, and associated solenoid 5 are interposed between two common polar yokes 13 and 14, extending to form corresponding direct induction pole-pieces defining a work surface 9, and a second work surface 9′, respectively. In this case, the direction of magnetization for the two cores is parallel, because they contact the same face of each yoke 13 and 14. In FIG. 5, an embodiment is shown in which the work surfaces are deactivated and magnetic flux 15 is shortcircuited through yokes 13 and 14 and magnetopermanent cores 3 and 4. However, as in the preceding cases, by inverting the direction of magnetization for reversible core 4, through a suitable electromagnetic field generated by solenoid 5, the two magnetopermanent fields are in opposition, activating work surfaces 9 and 9′.

Figure 6:
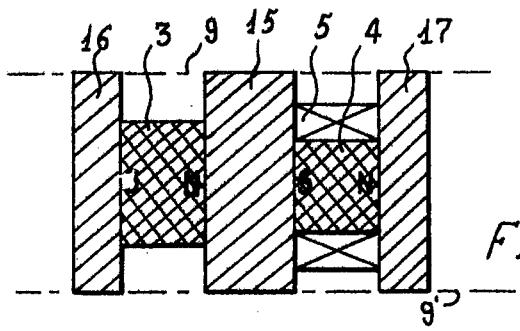
FIG. 6 shows a further modification of the magnetic circuit.

A fourth embodiment is depicted in FIG. 6, showing the circuit configuration for a larger work surface. Also in this embodiment the work surface is divided, and the two non-reversible magnetopermanent cores 3 are arranged in aligned relationship against the opposite faces of common yoke 15, forming the direct induction pole-piece. The remaining two lateral yokes 16 and 17, forming the indirect induction pole-pieces, define with yoke 5 work surfaces 9 and 9′.

On activating the work surfaces, pole-piece 15 is subjected to a magnetic field generated by two poles of the same non-reversible magnetopermanent core 3 and reversible polarity by magnetopermanent core 4. Thereby, also the two pole-pieces 16 and 17 are subjected to a magnetic field induced by the remaining poles of the two magnetopermanent cores, which poles are of the same polarity.

The half-hysterisis loop characteristic of reversible magnetopermanent core 4 (as provided by the electromagnetic effect of solenoid 5) results in the attraction of the two poles contacting the pole-piece 15 which, in such a case, is no longer an actual pole-piece, but performs the function of flux transmission from the pole of the non-reversible magnetopermanent core to that of the reversible magnetopermanent core. Thereby, the work surface associated with that pole-piece is made neutral. In turn, the two pole-pieces 16 and 17 are subjected to a magnetic field generated by two poles of opposite polarity.

As a result, in the case of the embodiment of FIG. 6, all of the pole-pieces, except the first and the last, will be subjected to a natural magnetic field whenever reversible cores 4 are attracting along with non-reversable cores 3, thus rendering the work surface substantially inactive.

With respect to the preceding embodiments, the embodiment of FIG. 6 can be effective in all of those applications wherein the covering of a wide work surface is not accompanied by the necessity of a considerable concentration of field forces.

The advantages of the described magnetopermanent circuits are apparent and can be summarized as follows: A remarkably higher magnetic performance over that which can be provided with the same mass of magnetopermanent material used in a conventional circuit.

Reversible magnetopermanent core 4 comprising Alnico V, as known, always operates with a nearly zero reluctance, independently of the gap (distance between North and South poles) of the work surface. For example, this is illustrated in FIGS. 3 and 4, showing that, upon engagement of the work surface, the magnetopermanent circuit of reversible core 4 is not subjected to "breakages", becoming complete through the material 10 to be anchored and that of non-reversible core 3. Upon deactivation of the work surface (FIG. 2), the magnetic circuit is completed through non-reversible core 3.

As a result, in magnetic the circuit according to the invention the magnetopermanent material comprising reversible core 4 develops a magnetic characteristic quite similar to the Brem curve 1 of FIG. 1 whenever the work surface of that circuit is engaged by the material 10 to be anchored. The case of apparatus provided with a plurality of magnetic circuits, those core sectors or cores not engaged by the material to be anchored will, upon activation of the work surface thereof, undergo a fall in the Brem rate proportional to the work gap, as soon as the electromagnetic field of solenoid 5 ceases, but such a fall is always of a neglectable value, because of the operative uselessness of the zones not engaged by the work surface. On the other hand, the Brem rate of such core sectors or complete cores will be fully reset as soon as the first inversion (half-hysterisis) of reversible core(s) 4 is carried out. Thus, the polar inversion of reversible core 4 always brings the latter to a Brem point (curve 1 of FIG. 1) as a rate of magnetopermanent residue, even if of opposite sign to the former point, at which reversible core 4 will operate whenever the overlying operative surface sector is engaged by the material 9 to be anchored.

The foregoing eliminates the necessity of calibrating the gap amplitude on the characteristics of reversible core 4. Accordingly, such an amplitude can be maintained as large as possible. In the operative embodiment of FIG. 2 the gap amplitude corresponds to the polar length the non-reversible core 3, thus obtaining a truly unique "range" or depth of the useful field.

The provision of the magnetopermanent field of non-reversible core 3, the total Brem rate of which is the same as that of reversible core 4, approximately doubles the field strength developed by reversible core 4 on the engaged work surface. That is, the sum of the two magnetopermanent fields engages to the top of indirect induction pole-piece(s) 7 and the whole of direct induction pole-piece 6, the sections of which are accordingly calibrated. This will result in a magnetopermanent anchoring force which could not be provided at all by conventional magnetic equipment, either of the electromagnetic or permanent magnet type.

In other terms, under the same considerations, a reversible core of "Alnico V" used in the circuit according to the invention develops magnetic performances three times higher than those that the same core could provide if used in the best known conventional circuit.

Figure 7:
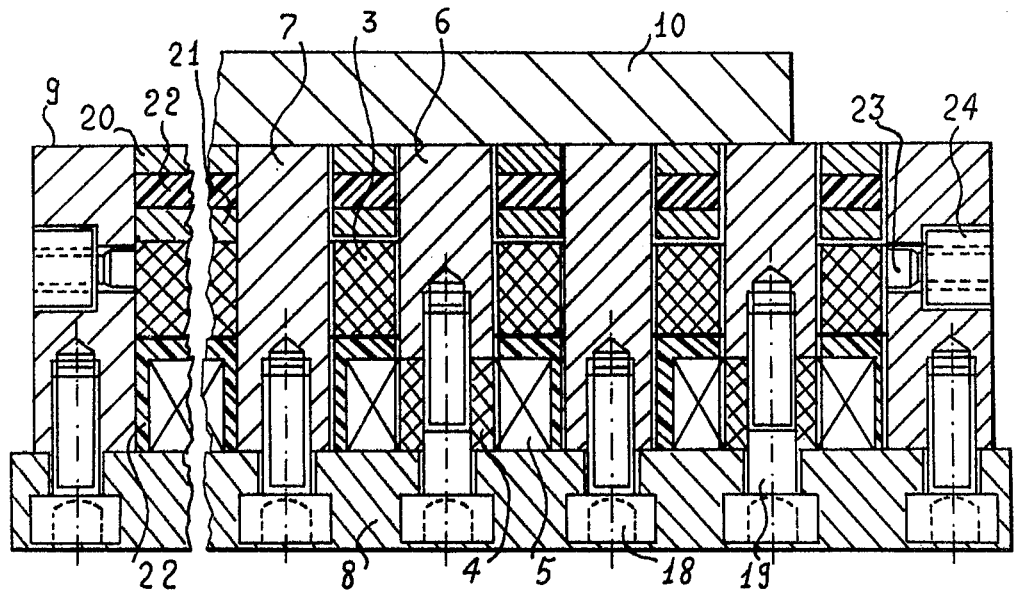
FIG. 7 is a view showing a practical embodiment of a magnetic holding apparatus according to the invention.

Referring now to FIG. 7, the following description is of a particular preferred embodiment for a magnetic anchoring apparatus, based on the operative circuit of FIG. 4 and affording substantial novelties in its construction and assembly.

In FIG. 7, like parts corresponding to those of FIG. 4 have been designated by like reference numerals. However, in this case, indirect induction pole-pieces 7 are of a large cross-section than in the case of FIGS. 2, 3 and 4, for the conduction of a higher flux and simultaneously serving for two adjoining elemental magnetic circuits.

As shown in FIG. 7, all of the components of the magnetic plane or table are secured to magnetic joining crown or base 8 and indirect induction pole-pieces 7 through anchoring screws 18 and 19. Of course, in the case of pole-pieces 6, anchoring screws 19 will pass through a hole provided in the respective reversable magnetopermanent core 4.

A spacer 20 of paramagnetic material is placed within the work slots or gaps, and has a transverse hole 21 which is filled with a paramagnetic material 22, such as an exposy resin, occupying all of the remaining empty spaces, imparting nonalithic structure to the whole plane or table. Reference numeral 23 designates tie-rods of paramagnetic material perpendicular to the development direction of the pole-pieces which are locked by threaded bushings 24.

Thus, a magnetic anchoring apparatus is provided, having a work surface with a plurality of pole-pieces parallel to one another and intercalated by slots or gaps. Such pole-pieces are alternately of direct induction and indirect induction design, which can be activated and deactivated as previously described.

The magnetopermanent anchoring plane or table thus provided is characterized by an absolute mechanical stability of the work surface and by highly reduced weight and overall size.

The magnetic anchoring apparatus as described, with reference to the magnetic circuits of any of the preceding figures and particularly of the design shown in FIG. 7, can be used for hoists or lifts, palletizing and depalletizing heads and general anchoring platforms or tables, wherein the work surface has to be activated and deactivated.

In all of the embodiments herein shown, it will be seen that pole-pieces extend for some distance beyond the non-reversible core or cores. Thereby, above non-reversible cores 3 a proper thickness of workable material can be provided, enabling, as the apparatus is used, repeated and successive finishing operations of the work surface, should the latter be worn out, without having to use an additional surface plate, as occurs in prior art apparatus or devices.

With reference to FIGS. 2 and 3, another modification to the apparatus can be described.

Reference numeral 3' shows by dashed lines a second solenoid surrounding non-reversible core 3. This solenoid 3' is supplied in parallel with solenoid 5 of the reversible core only during activation of work surface 9, so as to equalize the demagnetizing effects that the electromagnetic field of solenoid 5 would generate on non-reversible core 3. This approach enables the use of non-reversible cores of Alnico V, providing a larger anchoring force on work surface 9.

What is claimed is:

1. Magnetic apparatus for holding ferromagnetic pieces, comprising:

magnetopermanent cores defining a magnetic circuit having a work surface and including a first non-reversible magnetopermanent core of an anisotropic ceramic type material, a second reversible magnetopermanent core member of a melted type anisotropic material having a magnetic remanence greater than twice the magnetic remanence of said first core and a coercitivity less than one-third of said first core;

a magnetic yoke defining part of said work surface and coacting with said first and second magnetopermanent cores;

a polarization inverting solenoid surrounding said second reversible core for generating electromagnetic fields for inverting the polarization of said second core and respectively activating or deactivating said work surface;

said non-reversible core is interposed between said yoke and an indirect induction polar element to form a direct induction polar element, said first non-reversible core having a direction of magnetization perpendicular to said polar elements;

said second reversible core member is aligned with said yoke and has a direction of magnetization perpendicular to said first non-reversible core; and further comprising a ferromagnetic crown common to said polar elements and opposite said work surface.

2. Magnetic apparatus for holding ferromagnetic pieces, comprising:

magnetopermanent cores defining a magnetic circuit having a work surface and including a first non-reversible magnetopermanent core of an anisotropic ceramic type material, and a second reversible magnetopermanent core member of a melted type of anisotropic material having a magnetic remanence greater than twice the magnetic remanence of said first core and a coercitivity less than one-third of said first core;

a magnetic yoke defining part of said work surface and coacting with said first and second magnetopermanent cores;

a polarization inverting solenoid surrounding said second reversible core for generating electromagnetic fields for inverting the polarization of said second core and respectively activating and deactivating said work surface;

said second reversible core is aligned with and has a direction of magnetization parallel to said yoke and including two non-reversible cores opposite said yoke and positioned between the latter and an associated indirect induction polar element; and said two non-reversible cores being arranged against said yoke with respective directions of polarization opposite to one another and perpendicular to the latter; and further comprising a ferromagnetic crown opposite said work surface.

3. Magnetic apparatus for holding ferromagnetic pieces, comprising:

magnetopermanent cores defining a magnetic circuit having a work surface and including a first non-reversible magnetopermanent core of an anisotropic ceramic type material, and a second reversible magnetopermanent core member of a melted type anisotropic material having a magnetic remanence greater than twice the magnetic remanence of said first core and a coercitivity less than one-third of said first core;

a magnetic yoke defining part of said work surface and coacting with said first and second magnetopermanent cores;

a polarization solenoid surrounding said reversible core for generating electromagnetic fields for inverting the polarization of said second core and respectively activating or deactivating said work surface;

a plurality of first polar elements spaced apart from one another;

a ferromagnetic support common to said first polar elements;

a plurality of second polar elements alternately interposed between said first polar elements and defining slots parallel to one another, each defining a common magnetic yoke;

said reversible core member being surrounded by a respective inverting electromagnet and arranged between each of said second polar elements and said ferromagnetic support;

said non-reversible core arranged in each of said slots with a polarization direction perpendicular to said polar elements thereby defining a work surface activated by polar elements alternately of opposite polarity;

said polar elements and said reversible core member being secured by fastening screws; and spacers of paramagnetic material being superimposed with respect to said non-reversible core member and locked by a transverse tie-rod.

4. An apparatus according to claim 3, wherein said polar elements extend beyond said non-reversible core member to the apparatus work surface.

5. An apparatus according to claim 3, wherein the empty spaces between the parts comprising the apparatus are filled with an epoxy resin.

* * * * *